United States Patent
Lee et al.

(10) Patent No.: US 10,231,267 B2
(45) Date of Patent: Mar. 12, 2019

(54) ACCESS CONTROL METHOD AND APPARATUS BASED ON SERVICE LEVEL

(71) Applicant: ELECTRONICS AND TELECOMMUNICATIONS RESEARCH INSTITUTE, Daejeon (KR)

(72) Inventors: Kye Seon Lee, Daejeon (KR); Tae Joon Park, Daejeon (KR); Byeong Cheol Choi, Daejeon (KR); Wun Cheol Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/784,310

(22) Filed: Oct. 16, 2017

(65) Prior Publication Data

US 2018/0167982 A1 Jun. 14, 2018

(30) Foreign Application Priority Data

Dec. 9, 2016 (KR) .................. 10-2016-0167445

(51) Int. Cl.
| | |
|---|---|
| *H04W 4/00* | (2018.01) |
| *H04W 76/10* | (2018.01) |
| *H04W 72/04* | (2009.01) |
| *H04W 28/02* | (2009.01) |
| *H04W 88/16* | (2009.01) |

(52) U.S. Cl.
CPC ........... *H04W 76/10* (2018.02); *H04W 28/02* (2013.01); *H04W 28/0268* (2013.01); *H04W 72/04* (2013.01); *H04W 72/048* (2013.01); *H04W 88/16* (2013.01)

(58) Field of Classification Search
CPC ..... H04W 28/02; H04W 72/04; H04W 76/10; H04W 28/0268; H04W 88/16; H04W 72/082; H04W 28/18; H04B 7/185; H04B 7/18558; G08C 15/00; H04L 47/822;
(Continued)

(56) References Cited

U.S. PATENT DOCUMENTS 6,775,251 B1 * 8/2004 Wiedeman ......... H04B 7/18558
370/316
9,144,072 B2 9/2015 Park
(Continued)

FOREIGN PATENT DOCUMENTS

KR 20090061501 A * 6/2009
WO WO-2009055827 A1 * 4/2009 ............ H04W 92/02
(Continued)

*Primary Examiner* — Mahendra Patel
(74) *Attorney, Agent, or Firm* — LRK Patent Law Firm (57) ABSTRACT

An operation method of a server in a communication network includes receiving a connection request message from each of a plurality of gateways connected to the server; identifying a service level of a terminal that has transmitted the connection request message based on information included in the connection request message; selecting a first gateway corresponding to the service level among the plurality of gateways as a gateway to which the terminal is to be connected; and transmitting a connection approval message, which is a response to the connection request message, to the terminal through the first gateway.

20 Claims, 6 Drawing Sheets

(58) Field of Classification Search
CPC ..... H04L 47/823; H04L 47/824; H04L 47/70; H04Q 7/00; H04J 1/00
USPC ..... 370/329, 316, 338; 455/12.1, 422.1, 445
See application file for complete search history.

(56) References Cited

U.S. PATENT DOCUMENTS

| | | | |
|---|---|---|---|
| 9,380,587 B1* | 6/2016 | Venkatraman | H04W 72/08 |
| 2004/0229621 A1* | 11/2004 | Misra | H04W 16/08 455/445 |
| 2008/0082709 A1 | 4/2008 | Lee et al. | |
| 2008/0144588 A1 | 6/2008 | Mezer et al. | |
| 2009/0232142 A1* | 9/2009 | Li | H04W 8/26 370/395.3 |
| 2010/0110887 A1* | 5/2010 | Beaujean | H04L 47/822 370/230 |
| 2010/0216450 A1* | 8/2010 | Fujishima | H04W 72/082 455/422.1 |
| 2013/0223423 A1 | 8/2013 | Lee et al. | |
| 2014/0003408 A1* | 1/2014 | Chhabra | H04W 48/16 370/338 |
| 2014/0357287 A1* | 12/2014 | Han | H04B 7/024 455/450 |
| 2015/0195747 A1* | 7/2015 | Ho | H04W 74/06 370/329 |
| 2015/0327265 A1* | 11/2015 | Lee | H04W 72/0446 370/311 |

FOREIGN PATENT DOCUMENTS

| | | | | |
|---|---|---|---|---|
| WO | WO-2012079357 A1 * | 6/2012 | | H04W 28/0289 |
| WO | WO-2012107004 A1 * | 8/2012 | | H04W 36/0088 |

* cited by examiner

ACCESS CONTROL METHOD AND APPARATUS BASED ON SERVICE LEVEL

CROSS-REFERENCE TO RELATED APPLICATION (S)

This application claims priority to Korean Patent Application No. 10-2016-0167445, filed Dec. 9, 2016 in the Korean Intellectual Property Office (KIPO), the entire content of which is hereby incorporated by reference.

BACKGROUND

1. Field of the Invention

The present disclosure relates to a communication technology for supporting unlicensed bands, and more specifically, to a method and an apparatus for controlling access to gateways in unlicensed bands based on a service level of a terminal.

2. Description of Related Art

With the development of information and communication technologies, various wireless communication technologies are being developed. Wireless communication technologies are broadly classified into wireless communication technologies using licensed bands and wireless communication technologies using unlicensed bands (e.g., an industrial scientific medical (ISM) band). Since a licensed band is licensed exclusively to an operator, wireless communication technologies using the licensed band, can provide better reliability and better communication quality than wireless communication technologies that use unlicensed bands.

A long term evolution (LTE) standard defined in the 3rd generation partnership project (3GPP) may be a typical wireless communication technology using a licensed band. In the LTE communication network, each of base stations (e.g., evolved Node-B (eNB)) and terminals (e.g., user equipment (UE)) can transmit and receive signals through a license band. Also, a wireless local area network (WLAN) defined as Institute of Electrical and Electronics Engineers (IEEE) 802.11 may be a typical wireless communication technology using an unlicensed band. In the WLAN communication network, each of an access point (AP) and stations (STAB) can transmit and receive signals through an unlicensed band.

In the existing communication technology supporting an unlicensed band, a terminal transmits data by accessing a channel according to a random backoff procedure, and a higher priority of accessing the channel is given to a terminal having a higher service level by varying a size of a contention window (CW) according to service levels of terminals. However, such a technology alone may have a problem. Specifically, in a network environment in which a large number of terminals are connected to a gateway, it may be difficult to ensure channel access of a terminal having a high service level even if the CW size varies depending on the service levels.

Meanwhile, the technology as a related art is intended to enhance understanding of the background of the invention, and may include contents that are not known to the person of ordinary skill in the art.

SUMMARY

Accordingly, embodiments of the present disclosure provide a method and an apparatus for controlling access to gateways by selecting a gateway corresponding to a service level of a terminal.

In order to achieve the objective of the present disclosure, an operation method of a server in a communication network may comprise receiving a connection request message from each of a plurality of gateways connected to the server; identifying a service level of a terminal that has transmitted the connection request message based on information included in the connection request message; selecting a first gateway corresponding to the service level among the plurality of gateways as a gateway to which the terminal is to be connected; and transmitting a connection approval message, which is a response to the connection request message, to the terminal through the first gateway.

The connection request message may include an identifier of an application supported by the terminal, and the service level of the terminal may be identified based on the identifier of the application.

The connection request message may include an indicator indicating a received signal strength of the connection request message that has been transmitted by the terminal measured by the each of the plurality of gateways. The indicator may be included in at least one of a header and a payload of the connection request message.

The connection approval message may include resource information indicating a resource allocated to the terminal based on the service level. The resource information may be included in at least one of a header and a payload of the connection approval message.

The selecting a first gateway may further include identifying a number of terminals connected to each of the plurality of gateways; and selecting a gateway having a terminal density equal to or lower than a terminal density corresponding to the service level of the terminal among the plurality of gateways as the first gateway. Also, the operation method may further comprise, when two or more gateways having a terminal density equal to or lower than the terminal density corresponding to the service level of the terminal exist, identifying received signal strengths of the connection request message measured at the two or more gateways; and selecting a gateway having a largest received signal strength among the two or more gateways as the first gateway.

In order to achieve the objective of the present disclosure, an operation method of a terminal in a communication network including a plurality of gateways and a server connected to the plurality of gateways may comprise transmitting a connection request message; receiving a connection approval message in response to the connection request message through a first gateway among the plurality of gateways; and transmitting and receiving data to and from the server through the first gateway, wherein the first gateway is selected by the server based on a service level of the terminal.

The connection request message may include an identifier of an application supported by the terminal, and the service level of the terminal may be identified based on the identifier of the application.

The connection approval message may include resource information indicating a resource allocated to the terminal based on the service level. The resource information may be included in at least one of a header and a payload of the connection approval message.

In order to achieve the objective of the present disclosure, a server operating in a communication network may comprise a processor and a memory storing at least one instruction to be executed by the processor. Also, the at least one instruction may be configured to receive a connection request message from each of a plurality of gateways connected to the server; identify a service level of a terminal that has transmitted the connection request message based on information included in the connection request message; select a first gateway corresponding to the service level among the plurality of gateways as a gateway to which the terminal is to be connected; and transmit a connection approval message, which is a response to the connection request message, to the terminal through the first gateway.

The connection request message may include an identifier of an application supported by the terminal, and the service level of the terminal may be identified based on the identifier of the application.

The connection request message may include an indicator indicating a received signal strength of the connection request message that has been transmitted by the terminal measured by the each of the plurality of gateways. The indicator may be included in at least one of a header and a payload of the connection request message.

The connection approval message may include resource information indicating a resource allocated to the terminal based on the service level. The resource information may be included in at least one of a header and a payload of the connection approval message.

The at least one instruction may be further configured to, in order to select the first gateway, identify a number of terminals connected to each of the plurality of gateways; and select a gateway having a terminal density equal to or lower than a terminal density corresponding to the service level of the terminal among the plurality of gateways as the first gateway.

The at least one instruction may be further configured to, when two or more gateways having a terminal density equal to or lower than the terminal density corresponding to the service level of the terminal exist, identify received signal strengths of the connection request message measured at the two or more gateways; and select a gateway having a largest received signal strength among the two or more gateways as the first gateway.

According to the embodiments of the present disclosure, the server determines a service level of a terminal and determines a gateway according to the service level of the terminal, thereby enabling degree of competition to be adjusted according to the service level of the terminal. Also, as the service level of the terminal increases, communications with the server are performed through a gateway having a lower channel congestion, so that consistent communication quality corresponding to the service level of the terminal can be assured.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, wireless communication networks to which exemplary embodiments according to the present disclosure will be described. However, wireless communication networks to which exemplary embodiments according to the present disclosure are applied are not restricted to what will be described below. That is, exemplary embodiments according to the present disclosure may be applied to various wireless communication networks.

According to Institute of Electrical and Electronics Engineers (IEEE) 802.11 Media Access Control (MAC) supporting a distributed coordination function (DCF), data transmission may be performed according to order of data arriving at a transmission queue. Each of stations (STAs) belonging to a basic service set (BSS) may have the same service level and attempt a wireless medium connection based on a priority of its service level.

According to IEEE 802.11 MAC supporting a point coordination function (PCF), non-contention periods and contention periods may be provided based on a beacon frame transmitted from an access point (AP). Since the IEEE 802.11 MAC supporting PCF employs simple round robin scheduling, it may be difficult to provide traffic-specific transmission priorities for various types of traffic. Also, according to the IEEE 802.11 MAC supporting PCF, overhead due to the repetition of the contention periods and the non-contention periods may occur.

An IEEE 802.11 MAC supporting a hybrid coordination function (HCF) may transmit and receive data based on DCF and PCF. HCF may support two operations modes including an enhanced distributed channel access (EDCA) according to contention based channel access and a HCF controlled channel access (HCCA) according to non-contention based channel access using polling mechanism.

In order to support Quality of Service (QoS), the EDCA provides prioritized traffic services similar to differentiated services (DiffServ), and the HCCA provides parameterized traffic services similar to integrated services (IntServ).

That is, the EDCA provides a differentiated channel access function for frames to which different priorities are assigned from higher layers, but the HCCA provides parameter based QoS in infrastructure mode.

In a low-power long-distance wide area network (e.g., Long Range Wide Area Network (LoRaWAN)) in which a server, one or more gateways, and several terminals are configured in a star topology, a terminal may be defined in three classes according to its characteristics.

A terminal of class A may perform bidirectional communication by performing uplink transmission after a short downlink. The terminal of class A may be defined as a mode in which power consumption is minimized in a manner that power is supplied to the terminal during the uplink transmission to a server and power is shut off after a certain period of time after transitioning from a transmission mode to a reception mode.

A terminal of Class B may receive data through more slots. The terminal of class B may operate in a reception mode every period informed by a server, and the terminal may receive data from the server in the reception mode.

Specifically, the terminal of class B may receive a beacon frame including scheduling information (e.g., reception window information) from a gateway, and receive data from the server by operating in the reception mode in a reception window indicated by the received beacon frame.

A terminal of class C may always be supplied with power, so that the terminal of class C may always operate in the reception mode. At the time of transmission, the terminal of class C may transmit data using a method such as an additive links on-line Hawaii area (ALOHA).

The terminal of class C may require more power to operate than the terminal of class A or B. However, in the communication from the server to the terminal, a waiting time of the terminal of class C may be shorter than the waiting time of the terminal of class A or class B.

According to the EDCA defined in IEEE 802.11e, a contention window (or a backoff counter) according to a random backoff procedure may be set relatively short for a terminal having a relatively high priority. Therefore, the terminal having the relatively high priority may preferentially access a channel.

In the following description, a wireless communication network to which embodiments according to the present disclosure are applied will be described. The wireless communication network to which the embodiments according to the present disclosure are applied is not limited to the following description, and the embodiments according to the present disclosure may be applied to various wireless communication networks.

Figure 1:
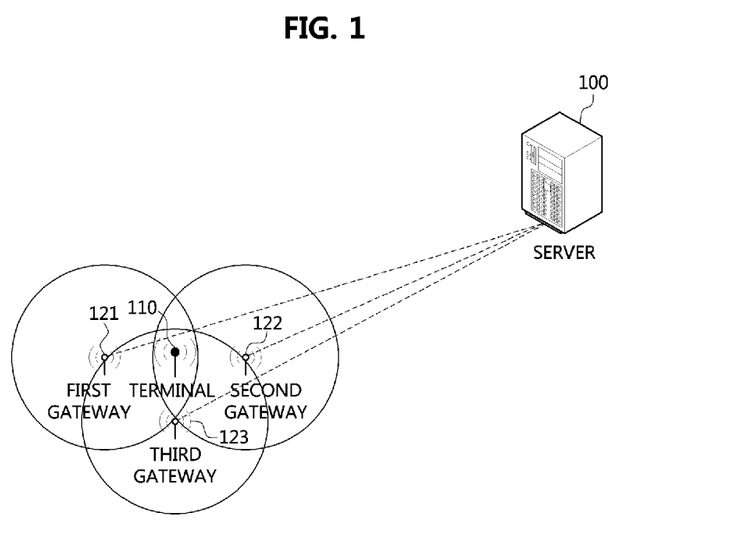
FIG. 1 is a conceptual diagram illustrating a wireless communication network.

FIG. 1 is a conceptual diagram illustrating a wireless communication network.

Referring to FIG. 1, communication nodes constituting a wireless communication network may include a server 100, a terminal 110, a first gateway 121, a second gateway 122, and a third gateway 123. The server 100 may be connected to the gateways 121, 122, and 123 wirelessly or by wire. The gateways 121, 122, and 123 may be wirelessly connected to the terminal 110. A connection request message of the terminal 110 may be transmitted to the server 100 through the gateways 121, 122, and 123.

The terminal 110 may be referred to as a user equipment (UE), a station (STA), a terminal, a device, a node, or the like. The server 100 may be referred to as a control server, a network server, a controller, and the like.

Each of the gateways 121, 122 and 123 may be referred to as a base station (BS), a Node-B (NB), an evolved Node-B (eNB), a base transceiver station (BTS), a radio base station, a radio transceiver, an access point, an access node, or the like.

The terminal 110 may be a device having communication capability, such as a desktop computer, a laptop computer, a tablet PC, a wireless phone, a mobile phone, a smart phone, a smart phone, a mobile phone, a smart watch, a smart glass, an e-book reader, a portable multimedia player (PMP), a portable game machine, a navigation device, a digital camera, a digital multimedia broadcasting (DMB) player, a digital audio recorder, a digital audio player, a digital picture recorder, a digital picture player, a digital video recorder, a digital video player, player, or the like.

The communications between the terminal 110 and the gateways 121, 122, and 123 separated by a distance of up to 15 km from the terminal 110 may be performed using the low-power long-distance wide area network communication technologies such as LoRaWAN.

Figure 2:
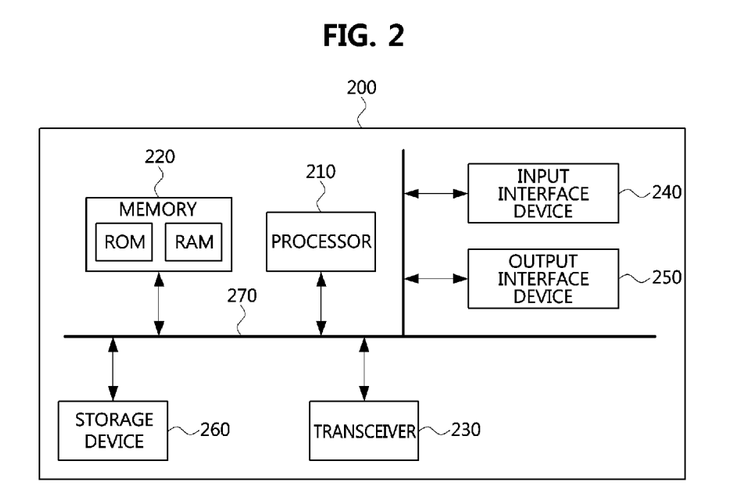
FIG. 2 is a block diagram illustrating an embodiment of a communication node constituting a wireless communication system.

FIG. 2 is a block diagram illustrating a first embodiment of a communication node constituting a communication system.

Referring to FIG. 2, a communication node 200 may comprise at least one processor 210, a memory 220 and a transceiver 230 connected to the network for performing communications. Also, the communication node 200 may further comprise an input interface device 240 an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Embodiments of the present disclosure may be applied to other communication networks as well as a WLAN. For example, embodiments of the present invention may be implemented in wireless personal area network (WPAN), wireless body area network (WBAN), wireless broadband internet (WiBro), long range wide area network (LoRaWAN), or world interoperability for microwave access (WiMax), 2G mobile communication networks such as global system for mobile communication (GSM) and code division multiple access (CDMA), 3G mobile communication networks such as wideband code division multiple access (WCDMA) or cdma2000, 3.5G mobile communication networks such as a high speed downlink packet access (HSDPA) or a high speed uplink packet access (HSUPA), 4G mobile communication networks such as the LTE or LTE-Advanced, and 5G mobile communication networks.

Figure 3:
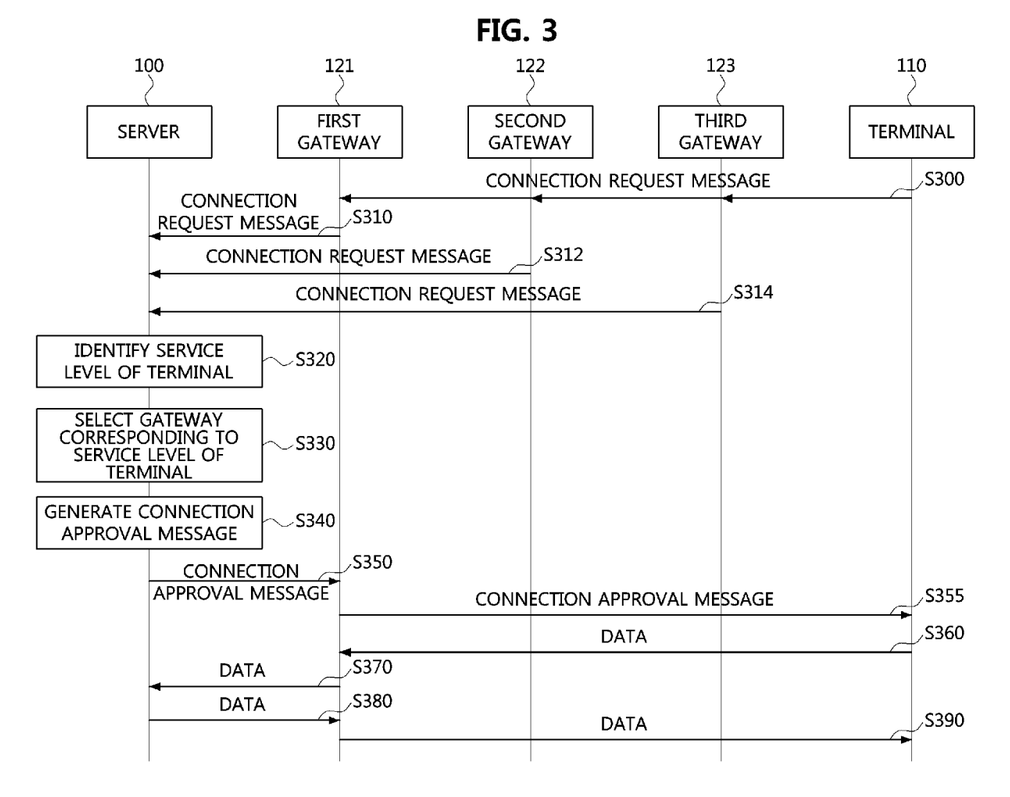
FIG. 3 is a flowchart for explaining a service level based method of accessing a wireless communication network.

FIG. 3 is a flowchart for explaining a service level based method of accessing a wireless communication network.

Referring to FIG. 3, a terminal 110, a plurality of gateways 121, 122, and 123, and a server 100 of FIG. 3 may correspond to the terminal 110, the plurality of gateways 121, 122, and 123, and the server 100 of FIG. 1, respectively.

The terminal 110 may transmit a connection request message (S300). For example, the connection request message may be transmitted in a broadcast manner, a multicast manner, or a unicast manner. Each of the plurality of gateways 121, 122, and 123 may receive the connection request message from the terminal 110.

Also, each of the plurality of gateways 121, 122, and 123 may measure a received signal strength of the connection request message and may generate a connection request message including an indicator (or information) indicating the received signal strength. Each of the plurality of gateways 121, 122, and 123 may transmit the connection request message including the indicator indicating the received signal strength to the server 100 (S310, S312, S314).

That is, the terminal 110 may transmit the connection request message to the server 100 through the plurality of gateways 121, 122, and 123. The connection request message may have the following configuration.

Figure 4:
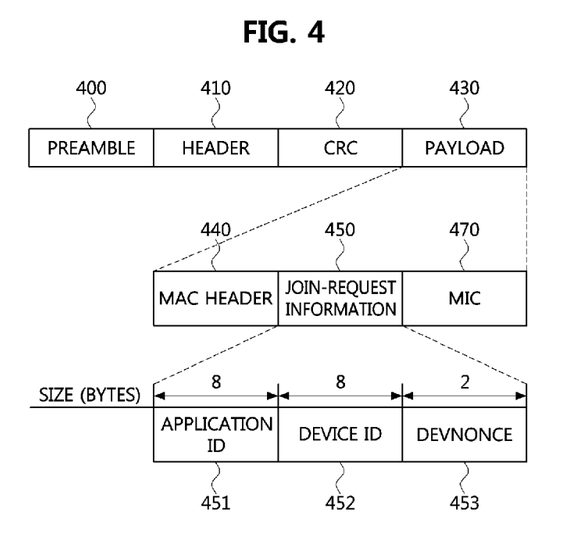
FIG. 4 is a block diagram illustrating an embodiment of a connection request message.

FIG. 4 is a block diagram illustrating an embodiment of a connection request message.

Referring to FIG. 4, a connection request message may include a preamble 400, a header 410, a cyclic redundancy check (CRC) field 420, and a payload 430. The preamble 400 may indicate a preliminary signal that is transmitted in advance in order to prevent a risk that the entire information will be erroneous due to a minute error when transmitting actual data.

The CRC of the CRC field 420 may refer to a check value for checking whether there is an error in data transmitted when the data is transmitted through a network or the like.

The payload 430 may include a MAC header (MHDR) 440, a join-request information field 450, and a message integrity code (MIC) field 470.

The join-request information field 450 included in the connection request message may include an application identifier (AppEUI) field 451, a device identifier (DevELTI) field 452, and a device random number (DevNonce) field 453. The AppEUI field 451 and the DevEUI field 452 may each have 8 bytes, and the DevNonce field 453 may have 2 bytes.

The application identifier of the AppEUI field 451 may be a global application identifier (ID) according to the IEEE extended unique identifier 64 (EUI64) address space that identifies an entity that can process the connection request message.

The application identifier may be stored in the terminal 110 before an activation procedure is executed. The service level of the terminal 110 may be determined at the server 100 based on the application identifier. The application identifier information may be included in the AppEUI 451 of the joint-request information field 450 of the terminal 110.

The device identifier of the device identifier field 452 may be a global ID of the terminal 110 according to the IEEE EUI64 address space that identifies the terminal 110. The device random number in the DevNonce field 453 may be any variable. The server 100 may track the device random number value used in the terminal 110 in the past. The server 100 may ignore the connection request when the terminal 110 has a specific device random number.

The connection request message may be referred to as an 'authentication request frame' or an 'association request frame' in a WiFi (i.e., IEEE802.11). The connection request message may be referred to as a 'join request message' in LoRaWAN.

The connection request messages transmitted from the plurality of gateways 121, 122 and 123 to the server 100 may further include an indicator indicating received signal strengths of the connection request message measured by the plurality of gateways 121, 122 and 123. The indicator may be included in at least one of the header 410 and the payload 430 of the connection request message.

Referring again to FIG. 3, the server 100 may receive the connection request message from each of the plurality of gateways 121, 122, and 123. The server 100 may identify the service level of the terminal 110 based on the application identifier information (S320). The server 100 may confirm the service level of the terminal 110 and select a gateway corresponding to the service level of the terminal 110 (S330). The gateway corresponding to the service level of the terminal 110 may be selected as follows.

Figure 5:
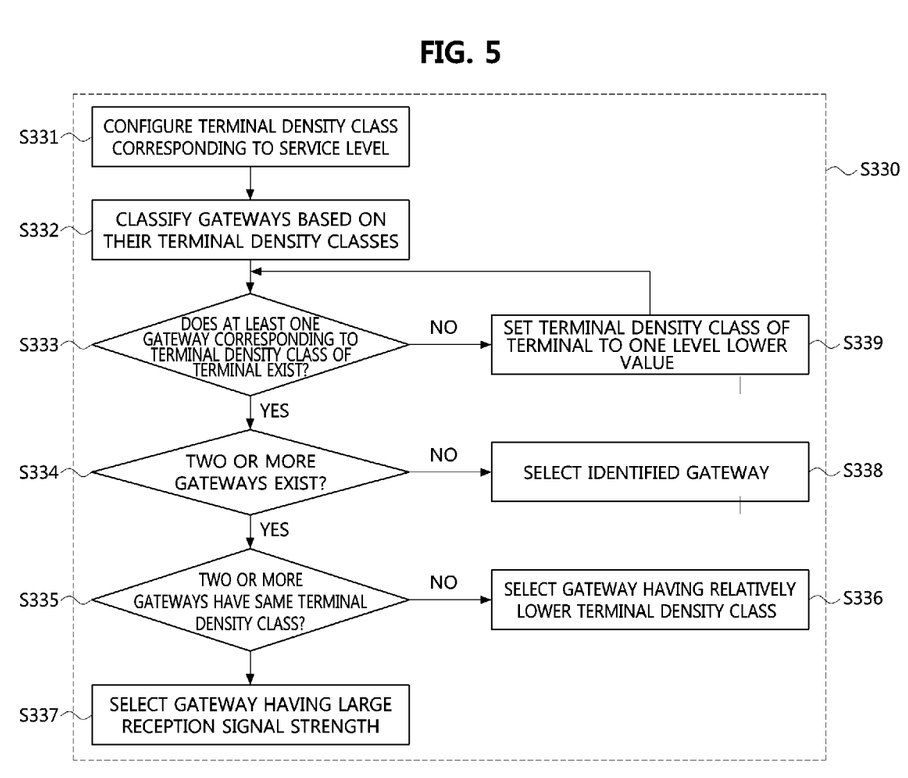
FIG. 5 is a flow chart for explaining a method of selecting a gateway.

FIG. 5 is a flow chart for explaining a method of selecting a gateway.

Referring to FIG. 5, the server 100 may select a gateway (e.g., the first gateway 121) having a terminal density class equal to or lower than a terminal density class corresponding to the service level of the terminal 110 among the plurality of gateways 121, 122, and 123 as a gateway to be used for communications between the server 100 and the terminal 110 (i.e., a gateway to which the terminal is to be connected).

More specifically, the terminal density class may indicate the number of terminals connected to the corresponding gateway. The server 100 may preconfigure terminal density classes corresponding to service levels (331).

For example, a service level 1 may correspond to a terminal density class 1, and the terminal density class 1 may indicate that the number of terminals connected to the gateway is 1 to 5.

Also, a service level 2 may correspond to a terminal density class 2 and the terminal density class 2 may indicate that the number of terminals connected to the gateway is 6 to 10. Also, a service level 3 may correspond to a terminal density class 3 and the terminal density class 3 may indicate that the number of terminals connected to the gateway is 11 to 15.

Also, a service level 4 may correspond to a terminal density class 4 and the terminal density class 4 may indicate that the number of terminals connected to the gateway is 16 or more. The terminal density class may be determined to be relatively low as the service level of the terminal 110 is high.

The terminal density class may be determined to be relatively high as the service level of the terminal 110 is low. The lower the terminal density class, the smaller the number of terminals connected to the gateway. The higher the terminal density class, the greater the number of terminals connected to the gateway.

For example, when the terminal density class 1 and the terminal density class 4 are compared, it may be interpreted that fewer terminals are connected to the gateway in the terminal density class 1. That is, the terminal density class 1 may be interpreted as a lower terminal density.

The higher the service level, the more priority is given to the communication resources. The lower the service level number, the higher the service level.

For example, when comparing the service level 1 and the service level 4, the service level 1 may be interpreted as having a higher service level. That is, the service level 1 may be interpreted as having a higher priority.

The server 100 may identify the number of terminals connected to the plurality of gateways 121, 122, and 123. The server 100 may classify terminal density classes of the plurality of gateways 121, 122 and 123 based on information on the number of terminals connected to the plurality of gateways 121, 122 and 123.

The information on the number of terminals connected to the plurality of gateways 121, 122, and 123 may be estimated by the server 100 based on the connection request messages received from the gateways 121, 122, and 123. If the number of terminals connected to the gateway is large, the corresponding terminal density may be measured relatively high. If the number of terminals connected to the gateway is small, the terminal density may be measured relatively low.

The server 100 may compare the terminal density class corresponding to the service level of the terminal with the terminal density classes of the plurality of gateways 121, 122 and 123, and determine whether a gateway having a terminal density class equal to or lower than the terminal density class corresponding to the service level exists among the plurality of gateways 121, 122, and 123 (S333).

When there is a gateway having the terminal density class equal to or lower than the terminal density class corresponding to the service level, the server 100 may determine whether the number of gateways having a terminal density class equal to or lower than the terminal density class corresponding to the service level is more than two (S334).

When the number of gateways having a terminal density class equal to or lower than the terminal density class corresponding to the service level is more than two, the server 100 may compare the terminal density classes of the two or more gateways (S335).

The server 100 may select a gateway having a relatively small terminal density class among the two or more gateways as a gateway to be used for communications between the server 100 and the terminal 110 (i.e., a gateway to which the terminal is to be connected) when the terminal density classes of the two or more gateways are not the same (S336).

The server 100 may check the received signal strength measured at each of the plurality of gateways 121, 122, and 123 based on the indicator included in the connection request message when the terminal density classes of the two or more gateways are the same.

The server 100 may select a gateway having a relatively large received signal strength for the terminal as a gateway to be used for communications between the server 100 and the terminal 110 (S337).

When only one gateway having a terminal density class equal to or lower than the terminal density class corresponding to the service level exists, the server 100 may select the gateway as a gateway to be used for communications between the server 100 and the terminal 110 (S338).

When a gateway having a terminal density class equal to or lower than the terminal density class corresponding to the service level does not exist, the server 100 may set the terminal density class corresponding to the service level of the terminal to a terminal density class that is one level lower (S339).

The server 100 may repeat the steps S332 to S339 until the gateway is selected based on the newly-set terminal density class.

Referring again to FIG. 3, the server 100 may select a resource in a manner similar to the manner of selecting the gateway corresponding to the service level of the terminal 110 (S330). Information on resources selectable by the server 100 may include at least one of information related to gateway allocation, time resource information, frequency resource information, hopping related information, dedicated channel related information, and random access related information.

The time resource information may include at least one of a predetermined transmission duration, a transmission delay time, and a guaranteed slot according to the service level of the terminal 110.

For example, in a manner such as distributing time to guaranteed slots and unguaranteed slots, more guaranteed slots may be allocated to a high priority terminal, and fewer guaranteed slots may be allocated to a low priority terminal.

The transmission duration may indicate a specific time duration for which the terminal 110 can transmit data. Also, the transmission delay time may indicate a specific time duration for which transmission is delayed when the terminal 110 can transmit data after a specific time. For example, the terminal can transmit data after the transmission delay time from a reception end time of a connection approval message.

The server 100 may allocate a relatively long transmission duration and a relatively short transmission delay time to a terminal having a higher service level. The server 100 may allocate a relatively short transmission duration and a relatively long transmission delay time to a terminal having a lower service level.

The frequency resource information may include information on the frequency bandwidth and the like. The server 100 may provide differentiated services according to the service level of the terminal 110 by widely allocating a frequency band to a terminal having a high service level and narrowly allocating a frequency band to a terminal having a low service level.

The random access related information may include information on a backoff counter, information on a contention window (CW), and the like. The server 100 may allocate a CW to a terminal having a high service level with a small amount, and allocate a CW to a terminal having a low service level with a large amount so that a differentiated service can be provided according to a service level of a terminal.

The channel hopping may be determined according to the service level. The server 100 may allocate a relatively large number of frequency bands to a terminal having a high service level and a small number of frequency bands to a terminal having a low service level.

For example, the server 100 may allocate eight frequency bands to a terminal having a high service level and allocate two frequency bands to a terminal having a low service level, thereby providing differentiated services according to a service level of a terminal 110.

A dedicated channel may mean a dedicated resource used by a particular terminal. The server 100 may configure a dedicated channel for a terminal whose service level is equal to or higher than a preset reference level and may not configure a dedicated channel if not.

The server 100 may generate a connection approval message (S340). The connection approval message may include information on resources allocated to the terminal 110 based on the service level of the terminal 110.

When the server 100 generates the connection approval message, the server 100 may transmit the generated connection approval message to the terminal 110 through the gateway selected according to the service level of the terminal 110 (S350, S355).

Specifically, the server 100 may transmit the connection approval message to the selected gateway, and the selected gateway may receive the connection approval message from the server 100. Then, the selected gateway may transmit the connection approval message to the terminal 110. The terminal 110 may receive the connection approval message from the selected gateway. The connection approval message may be configured as follows.

Figure 6:
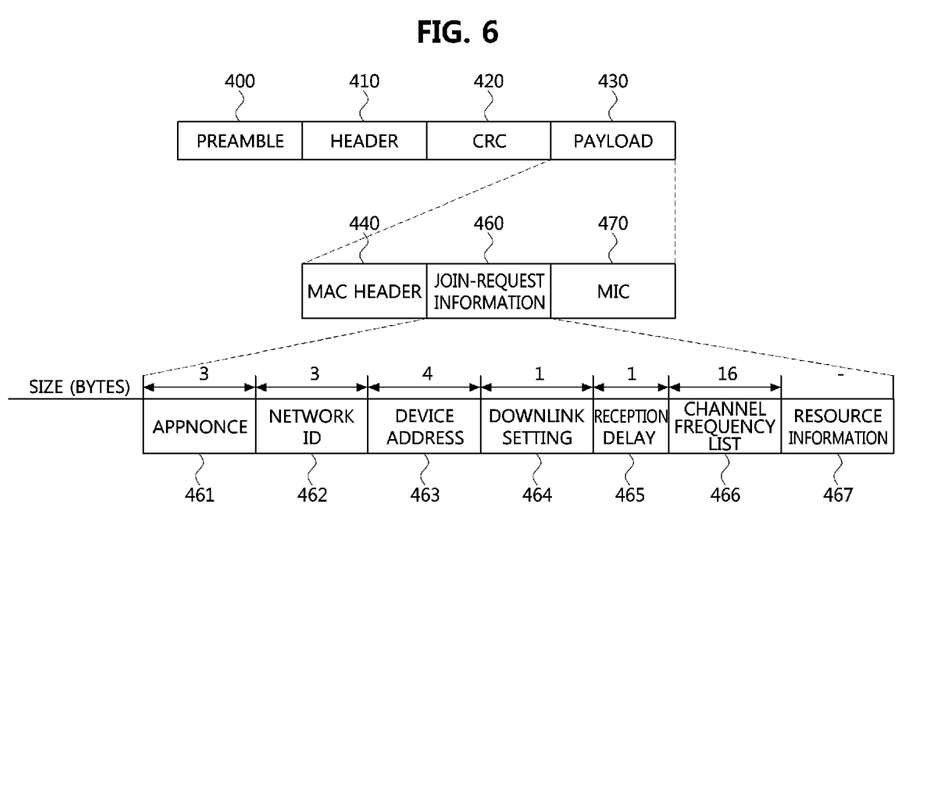
FIG. 6 is a block diagram illustrating an embodiment of a connection approval message.

FIG. 6 is a block diagram illustrating an embodiment of a connection approval message.

Referring to FIG. 6, a connection approval message may include a preamble 400, a header 410, a CRC field 420, and a payload 430.

The payload 430 may include a MAC header 440, a join-response information field 460, and a MIC field 470.

The join-response information field 460 may include an application random number (AppNonce) field 461, a network identifier (NetID) field 462, a device address (DevAddr) field 463, a downlink settings (DLSettings) field 464, a reception delay (RxDelay) field 465, a channel frequency list (CFList) field 466, a resource information field 467, and the like.

The AppNonce field 461 and the NetID field 462 may each have 3 bytes, the DevAddr field 463 may have 4 bytes, and the DLSettings field 464 and the RxDelay field 465 may each have one byte.

The AppNonce field 461 may be in a form of a random value or a unique ID provided by the server 100. The NetID field 462 may indicate an identifier unique of the network.

The DevAddr field 463 may indicate an address of the terminal 110. The RxDelay field 465 may indicate a specific time between transmission and reception. The CFList field 466 may indicate an optional list of channel frequencies.

The connection approval message may be referred to as an 'authentication response frame' or an 'association response frame' in a WiFi (i.e., IEEE802.11). The connection approval message may be referred to as a 'join accept message' in LoRaWAN.

The connection approval message may include the resource information allocated to the terminal 110 based on the service level of the terminal 110. The resource information may be included in at least one of the header 410 and the payload 430 of the connection approval message.

The resource information may include at least one of information related to gateway allocation, time resource information, frequency resource information, hopping-related information, dedicated channel related information, and random access related information.

Referring again to FIG. 3, the terminal 110 may receive the connection approval message from the gateway selected according to the service level of the terminal 110. The terminal 110 may identify from which gateway the connection approval message is received.

The terminal 110 may identify the information included in the connection approval message. The information included in the connection approval message may include the resource information allocated according to the service level.

The terminal 110 may transmit data to the server 100 through the gateway (S360, S370). The server 100 may receive data from the terminal 110 through the gateway.

Specifically, the terminal 110 may transmit data to the gateway selected according to the service level of the terminal 110, and the selected gateway may receive the data from the terminal 110.

The gateway selected according to the service level of the terminal 110 may transmit data to the server 100. The server 100 may receive data from the selected gateway according to the service level of the terminal 110.

When there is information related to resource allocation (i.e., the resource information) in the connection approval message, the terminal 110 may transmit data to the server 100 or receive data from the server 100 through the gateway indicated by the resource information and the resource indicated by the resource information.

Specifically, if the resource information includes backoff related information, the terminal 110 may select a backoff counter in a CW indicated by the backoff related information, perform a random backoff procedure based on the selected backoff counter, and then transmit and receive data to and from the server 100 through the gateway If there is time resource information (e.g., transmission duration, transmission delay time, etc.) in the resource information, the terminal 110 may transmit the data to the server 100 via the gateway on the basis of the transmission duration, the transmission delay time, etc.

Specifically, the terminal 110 may transmit data to the server 100 through the gateway during the transmission time duration indicated by the resource information. Also, the terminal 110 may transmit and receive data to and from the server 100 via the gateway after the transmission delay time indicated by the resource information.

When the resource information includes frequency resource information, the terminal 110 may transmit and receive data to and from the server 100 through the gateway at the corresponding frequency. When the resource information includes hopping-related information, the terminal 110 may perform hopping in a plurality of frequency bands allocated based on the hopping-related information, thereby transmitting and receiving data to and from the server 100 through the gateway.

If there is dedicated channel related information in the resource information, the terminal 110 may use dedicated channel and resource based on the dedicated channel related information, and transmit and receive data to and from the server 100 through the gateway and through the dedicated channel.

The server 100 may transmit data to the terminal 110 through the gateway (S380, S390). The terminal 110 may receive data from the server 100 through the gateway.

Specifically, the server 100 may transmit data to the gateway selected according to the service level of the terminal 110. The gateway selected according to the service level of the terminal 110 may receive the data from the server 100.

The gateway selected according to the service level of the terminal 110 may transmit the data to the terminal 110. The terminal 110 may receive the data from the gateway selected according to the service level of the terminal 110.

The result of controlling accesses of terminals according to service levels of the terminals may be as follows.

Figure 7:
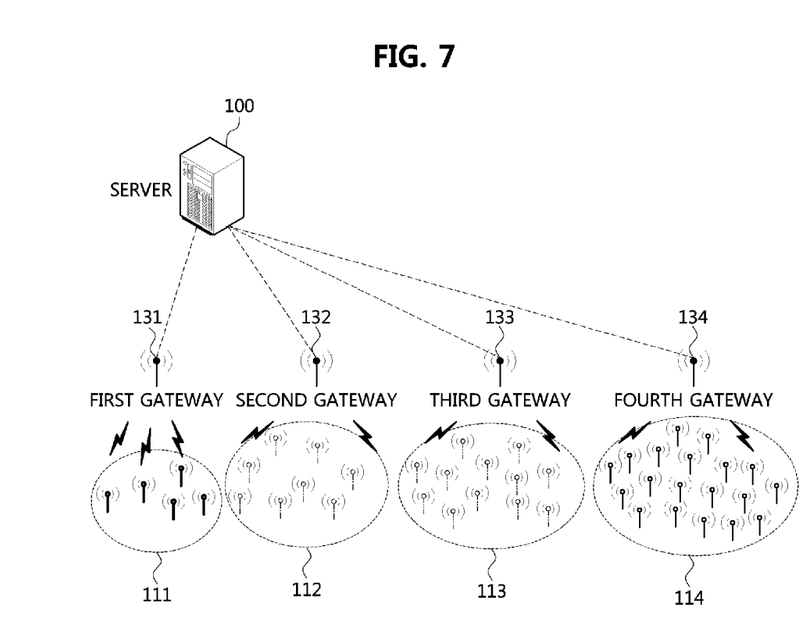
FIG. 7 is a conceptual diagram illustrating terminals connected to gateways according to their service levels in a wireless communication network.

FIG. 7 is a conceptual diagram illustrating terminals connected to gateways according to their service levels in a wireless communication network.

Referring to FIG. 7, it can be identified that there is a difference between the gateways to which the terminals 111, 112, 113 and 114 are connected according to the service levels of the terminals 111, 112, 113 and 114.

The terminal density classes of the gateways may be predetermined according to the service levels of the terminals. For example, a service level 1 may correspond to a terminal density class 1, and the terminal density class 1 may indicate that the number of terminals connected to the gateway is 1 to 5.

Also, a service level 2 may correspond to a terminal density class 2 and the terminal density class 2 may indicate that the number of terminals connected to the gateway is 6 to 10. Also, a service level 3 may correspond to a terminal density class 3 and the terminal density class 3 may indicate that the number of terminals connected to the gateway is 11 to 15.

Also, a service level 4 may correspond to a terminal density class 4 and the terminal density class 4 may indicate that the number of terminals connected to the gateway is 16 to 20. Also, a service level 5 may correspond to a terminal density class 5, and the terminal density class 5 may indicated that the number of terminal connected to the gateway is 21 or more.

The server 100 may classify the plurality of gateways 131, 132, 133, and 134 according to their terminal density classes. Specifically, the server 100 may classify the plurality of gateways 131, 132, 133, and 134 into the first gateway 131 belonging to a terminal density class 1 having 1 to 5 terminals connected thereto, the second gateway 132 belonging to a terminal density class 2 having 6 to 10 terminals connected thereto, the third gateway 133 belonging to a terminal density class 3 having 11 to 15 terminals connected thereto, and the fourth gateway 133 belonging to a terminal density class 4 having 16 or more terminals connected thereto.

When a terminal and the gateways 131, 132, 133, and 134 are located at a communicable distance, the server may identify a service level of the terminal through a connection request message from the terminal.

When the server 100 receives a plurality of connection request messages and determines a gateway to which a new terminal is to be connected while considering the terminal density class, the result may be as follows.

The first terminals 111 having the service level 1 may be connected to the first gateway 131 belonging to the terminal density class 1. The second terminals 112 having the service level 2 may be connected to the second gateway 132 belonging to the terminal density class 2. The third terminals 113 having the service level 3 may be connected to the third gateway 133 belonging to the terminal density class 3. The fourth terminals 114 having the service level 4 may be connected to the fourth gateway 134 belonging to the terminal density class 4.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a server in a communication network, comprising:
   receiving a connection request message from each of a plurality of gateways connected to the server;
   identifying a service level of a terminal that has transmitted the connection request message based on information included in the connection request message;
   selecting a first gateway corresponding to the service level among the plurality of gateways as a gateway to which the terminal is to be connected; and
   transmitting a connection approval message, which is a response to the connection request message, to the terminal through the first gateway,
   wherein the selecting a first gateway further includes,
   identifying a number of terminals connected to each of the plurality of gateways; and
   selecting a gateway having a terminal density equal to or lower than a terminal density corresponding to the service level of the terminal and signal strength among the plurality of gateways as the first gateway.

2. The operation method according to claim 1, wherein the connection request message includes an identifier of an application supported by the terminal, and the service level of the terminal is identified based on the identifier of the application.

3. The operation method according to claim 1, wherein the connection request message includes an indicator indicating a received signal strength of the connection request message that has been transmitted by the terminal measured by the each of the plurality of gateways.

4. The operation method according to claim 3, wherein the indicator is included in at least one of a header and a payload of the connection request message.

5. The operation method according to claim 1, wherein the connection approval message includes resource information indicating a resource allocated to the terminal based on the service level.

6. The operation method according to claim 5, wherein the resource information is included in at least one of a header and a payload of the connection approval message.

7. The operation method according to claim 1, further comprising:
when two or more gateways having a terminal density equal to or lower than the terminal density corresponding to the service level of the terminal exist, identifying received signal strengths of the connection request message measured at the two or more gateways; and
selecting a gateway having a largest received signal strength among the two or more gateways as the first gateway.

8. An operation method of a terminal in a communication network including a plurality of gateways and a server connected to the plurality of gateways, comprising:
transmitting a connection request message;
receiving a connection approval message in response to the connection request message through a first gateway among the plurality of gateways; and
transmitting and receiving data to and from the server through the first gateway,
wherein the first gateway is selected by the server based on a service level of the terminal and signal strength, and
wherein the first gateway selection includes selecting a gateway having a terminal density equal to or lower than a terminal density corresponding to the service level of the terminal and signal strength among the plurality of gateways as the first gateway.

9. The operation method according to claim 8, wherein the connection request message includes an identifier of an application supported by the terminal, and the service level of the terminal is identified based on the identifier of the application.

10. The operation method according to claim 8, wherein the connection approval message includes resource information indicating a resource allocated to the terminal based on the service level.

11. The operation method according to claim 10, wherein the resource information is included in at least one of a header and a payload of the connection approval message.

12. A server operating in a communication network, comprising a processor and a memory storing at least one instruction to be executed by the processor, wherein the at least one instruction is configured to:
receive a connection request message from each of a plurality of gateways connected to the server;
identify a service level of a terminal that has transmitted the connection request message based on information included in the connection request message;
select a first gateway corresponding to the service level among the plurality of gateways as a gateway to which the terminal is to be connected; and
transmit a connection approval message, which is a response to the connection request message, to the terminal through the first gateway,
wherein the at least one instruction is further configured to, in order to select the first gateway, identify a number of terminals connected to each of the plurality of gateways; and select a gateway having a terminal density equal to or lower than a terminal density corresponding to the service level of the terminal and signal strength among the plurality of gateways as the first gateway.

13. The server according to claim 12, wherein the connection request message includes an identifier of an application supported by the terminal, and the service level of the terminal is identified based on the identifier of the application.

14. The server according to claim 12, wherein the connection request message includes an indicator indicating a received signal strength of the connection request message that has been transmitted by the terminal measured by the each of the plurality of gateways.

15. The server according to claim 14, wherein the indicator is included in at least one of a header and a payload of the connection request message.

16. The server according to claim 12, wherein the connection approval message includes resource information indicating a resource allocated to the terminal based on the service level.

17. The server according to claim 16, wherein the resource information is included in at least one of a header and a payload of the connection approval message.

18. The server according to claim 12, wherein the at least one instruction is further configured to, when two or more gateways having a terminal density equal to or lower than the terminal density corresponding to the service level of the terminal exist, identify received signal strengths of the connection request message measured at the two or more gateways; and select a gateway having a largest received signal strength among the two or more gateways as the first gateway.

19. The operation method according to claim 1, wherein a terminal density class may indicate the number of terminals connected to the corresponding gateway, the server may preconfigure the terminal density class corresponding to service level, and the service level correspond to the density class of the terminal.

20. The operation method according to claim 1, wherein the selecting the first gateway comprises selecting a gateway having a largest received signal strength among the two or more gateways as the first gateway.

* * * * *